United States Patent [19]
Bundy

[11] Patent Number: 5,904,458
[45] Date of Patent: May 18, 1999

[54] BED RAIL MOUNT WITH CONCEALED ATTACHMENT

[75] Inventor: Don Bundy, Sapulpa, Okla.

[73] Assignee: Mid America Automotive Products, Inc., Sapulpa, Okla.

[21] Appl. No.: 09/131,477

[22] Filed: Aug. 10, 1998

[51] Int. Cl.$^6$ ........................................................ B60P 7/08
[52] U.S. Cl. ........................ 410/106; 410/101; 410/110
[58] Field of Search .................................... 410/101, 106, 410/110, 108, 115; 296/43, 41, 3; 248/499

[56] References Cited

U.S. PATENT DOCUMENTS

| | | | |
|---|---|---|---|
| 4,604,013 | 8/1986 | Elwell et al. | 410/106 |
| 4,650,382 | 3/1987 | Johnson | 410/110 |
| 5,618,140 | 4/1997 | Okland | 410/106 |
| 5,642,971 | 7/1997 | Ragsdale | 410/106 |
| 5,827,024 | 10/1998 | Davenport | 410/110 |

FOREIGN PATENT DOCUMENTS

| | | | |
|---|---|---|---|
| 387247 | 5/1965 | Switzerland | 248/499 |

*Primary Examiner*—Stephen T. Gordon
*Attorney, Agent, or Firm*—Molly D. McKay

[57] ABSTRACT

A bed rail mount consisting of a curved tube. The tube is provided with a female end for receiving one end of a cylindrical bed rail and provided with an opposite end that secures to a mounting plate. The mounting plate has gouged openings and ears which allow the mounting plate to be welded to an inside wall of the tube by welding the ears to the inside wall through the gouged openings. A flange nut is secured on a top side of the mounting plate so that it surrounds a central opening provided in the mounting plate. One end of a bolt extends through the central opening and engages the flange nut while an opposite end extends through a center opening in a wear plate, through a hole drilled in the vehicle, through a washer and engages a nut that secures the mount to the vehicle. An upwardly extending perimeter lip provided on the wear plate conceals the mounting plate.

3 Claims, 3 Drawing Sheets

5,904,458

BED RAIL MOUNT WITH CONCEALED ATTACHMENT

BACKGROUND OF THE INVENTION

1. Field of the Invention

The present invention relates to a mount for attaching a bed rail to a top portion of a carrier sidewall located on a bed of a pickup truck. More specifically, the present invention is a mount that is provided on one end with concealed attachment means for attaching the mount to a top portion of the carrier side wall and provided on an opposite end with means for holding one end of a cylindrical bed rail.

2. Description of the Related Art

A variety of bed rail mounts have been employed to secure a bed rail to the top portion of a carrier sidewall of a pickup truck's bed. Until now all such mounts had one disadvantage; they all had a means of attaching the mount that was visible or had openings in the mounts for admitting the necessary attachment means. In some styles of mounts, the attachment means or opening therefor was on the top of the mount where water and debris could reach the attachment means and cause rust or other types of damage. Although covers are normally provided to cover these openings and to try to hide the attachment means, the covers come loose over time and are lost. Also, the visible attachment means or opening therefore detracts from the esthetics of the mount.

The present invention addresses these problems by providing a mount that has on one of its ends a concealed means for attaching the mount to the top portion of the carrier sidewalls. The present invention has on its opposite end a slightly enlarged female end for receiving one end of a cylindrical bed rail. By employing two mounts constructed in accordance with the present invention, opposing ends of a cylindrical bed rail can be captured between the mounts and secured to the carrier sidewall of the bed of a pickup truck.

Cross-Reference to Related Applications

This application constitutes an improvement over patent application Ser. No. 08/947,231 filed on Oct. 8, 1997 for a "Bed Rail Mount" by the inventor of the present invention.

SUMMARY OF THE INVENTION

The present invention is a bed rail mount for securing a cylindrical bed rail to a sidewall of a bed of a pickup truck. The mount is a curved hollow tube that has opposite ends that lie in planes perpendicular to each other. The tube is provided with a slightly enlarged female end for receiving one end of a cylindrical bed rail. The other end of the tube is oval and is secured to a top of a mounting plate.

The mounting plate is provided with a central opening extending through it. A flange nut is riveted to the central opening so that the flange nut surrounds the opening and extends outward from the top of the mounting plate.

The mounting plate is also provided with four gouged openings. The gouged openings are preferably formed by making two slits in the mounting plate, one slit on either side of the mounting plate so that each slit is approximately equal distance from a perimeter of the mounting plate along the length of the slit. Once the slits have been made in the mounting plate, a punching device is employed to punch or gouge openings at each end of the slits. In order to gouge the openings into the mounting plate, the punch is placed on the bottom of the mounting plate so that the ears that are formed as the punch gouges the openings into the mounting plate will extend upward on the top of the mounting plate. Two of the gouged openings are located on one side of the mounting plate and the other two gouged openings are located on the other side of the mounting plate. Each of the gouged openings is provided with an ear that was gouged into the mounting plate as the gouged openings were formed. Each ear extends upward on the top of the mounting plate. The ears are provided on the mounting plate so that the ears enter into the oval end of the tube when the top of the mounting plate is placed against the oval end of the tube. The mounting plate is then welded to the oval end of the tube by welding through the gouged openings of the mounting plate, thus welding the mounting plate to an inside wall of the tube so that the welds are not visible on the outside of the mount.

A bolt is employed to secure the mount to a top portion of a sidewall. A hole is drilled through the top portion of the sidewall large enough for the bolt to pass through. One end of the bolt is placed through the central opening of the mounting plate and threaded into the flange nut. The opposite end of the bolt is placed through a center opening provided in a wear plate, then through the hole that was previously drilled through the top portion of the side wall, next through a washer and finally secured in place by a nut. The washer and nut are located behind a downwardly extending sidewall lip provided on the sidewall, and therefore, are not visible.

The wear plate is oval with an upwardly extending perimeter lip. The wear plate is slightly larger that the mounting plate so that when the mount is secured to the top portion of the sidewall, the perimeter lip of the wear plate completely covers and conceals the mounting plate. In addition to providing a means for concealing the mounting plate, the wear plate serves as a cushion between the mount and the top portion of the side wall in order to prevent the mount from scratching or otherwise damaging the paint on the top portion of the side wall.

DETAILED DESCRIPTION OF THE PREFERRED EMBODIMENT INVENTION

Figure 1:
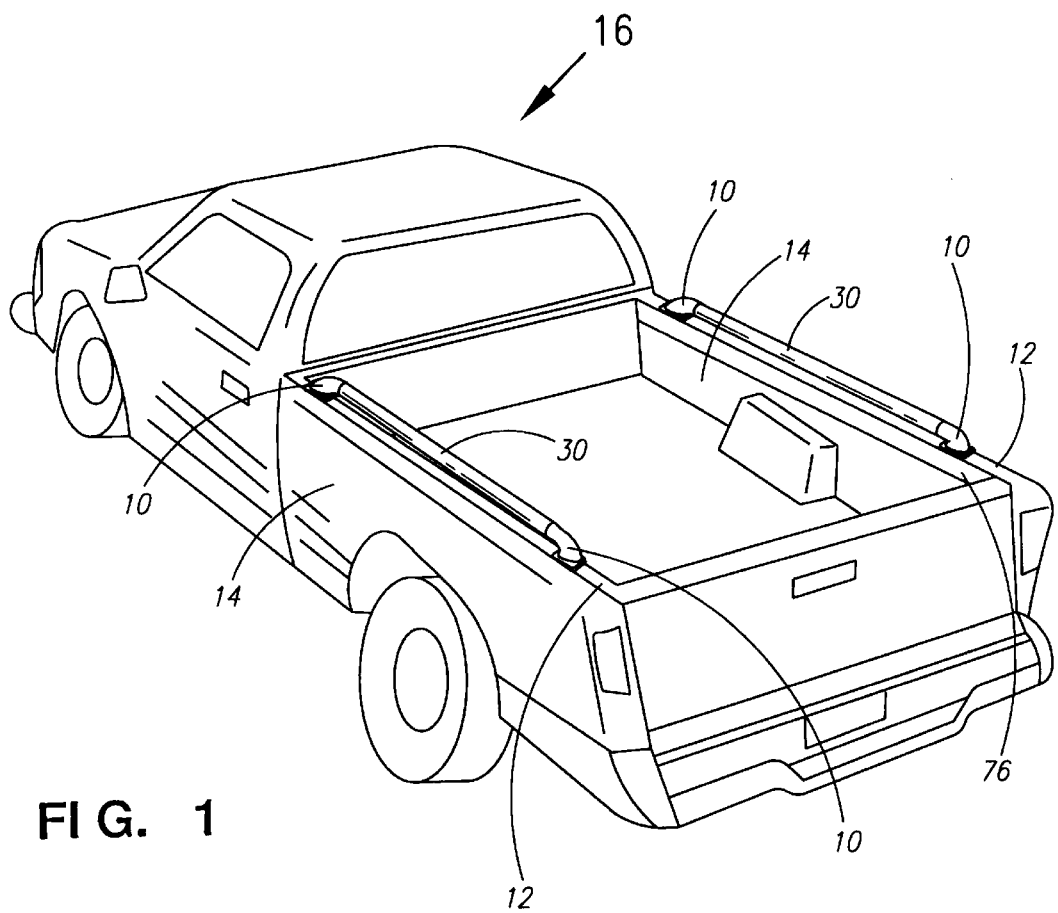
FIG. 1 is a perspective view of a pickup truck employing bed rail mounts constructed in accordance with the present invention.

Referring now to FIG. 1, there is illustrated four bed rail mounts 10 constructed in accordance with a preferred embodiment of the present invention. Each of the bed rail mounts 10 illustrated in FIG. 1 are secured to a top portion 12 of one of the sidewalls 14 of a pickup truck 16.

Figure 2:
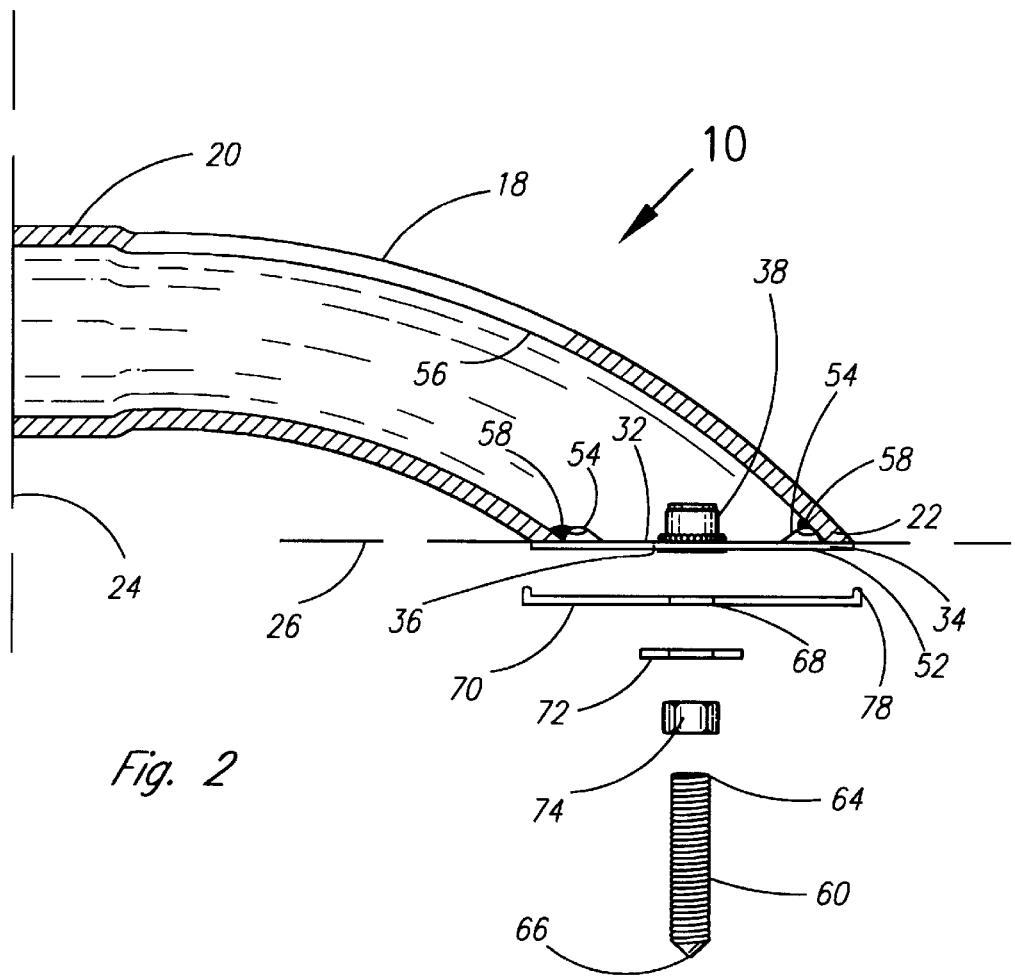
FIG. 2 is a partially cut away side view of one of the bed rail mounts of FIG. 1 shown removed from the pickup truck.
Figure 3:
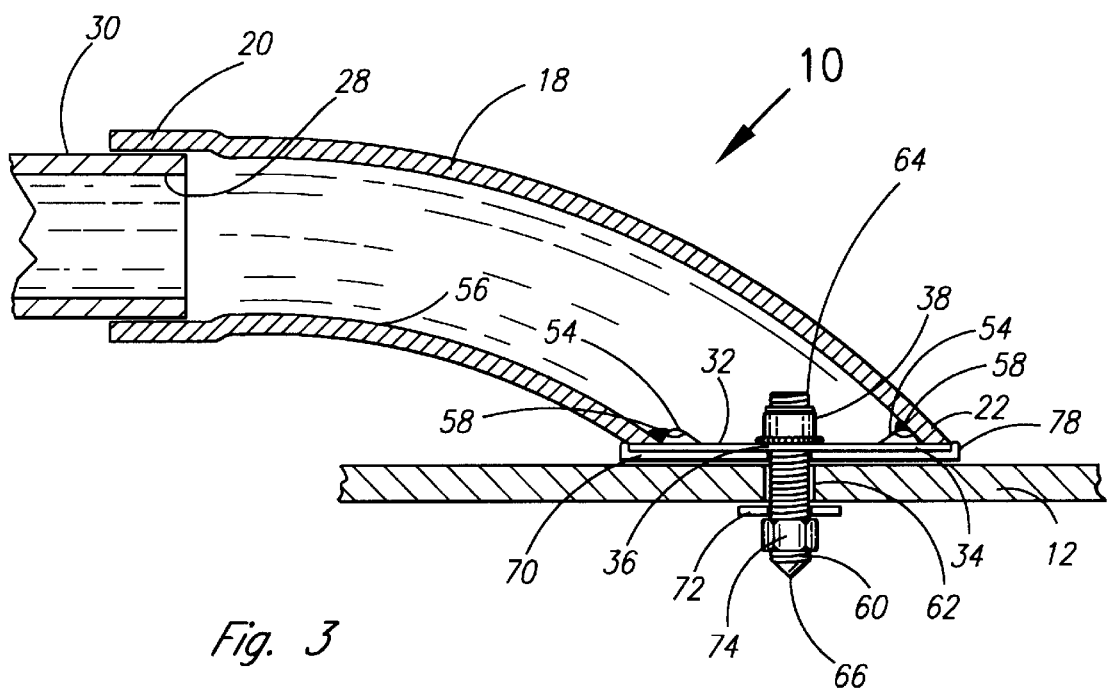
FIG. 3 is the bed rail mount of FIG. 2 shown attached to a top portion of a sidewall of a bed of a pickup truck.

Referring now also to FIGS. 2 and 3, the mount 10 is comprised of a curved hollow tube 18 that has opposite ends 20 and 22 that lie in planes 24 and 26, respectively, such that the planes 24 and 26 are perpendicular to each other. The tube 18 is provided with slightly enlarged female end 20 for receiving one end 28 of a cylindrical bed rail 30. The other end 22 of the tube 18 is oval and is secured to a top 32 of a mounting plate 34.

Figure 4:
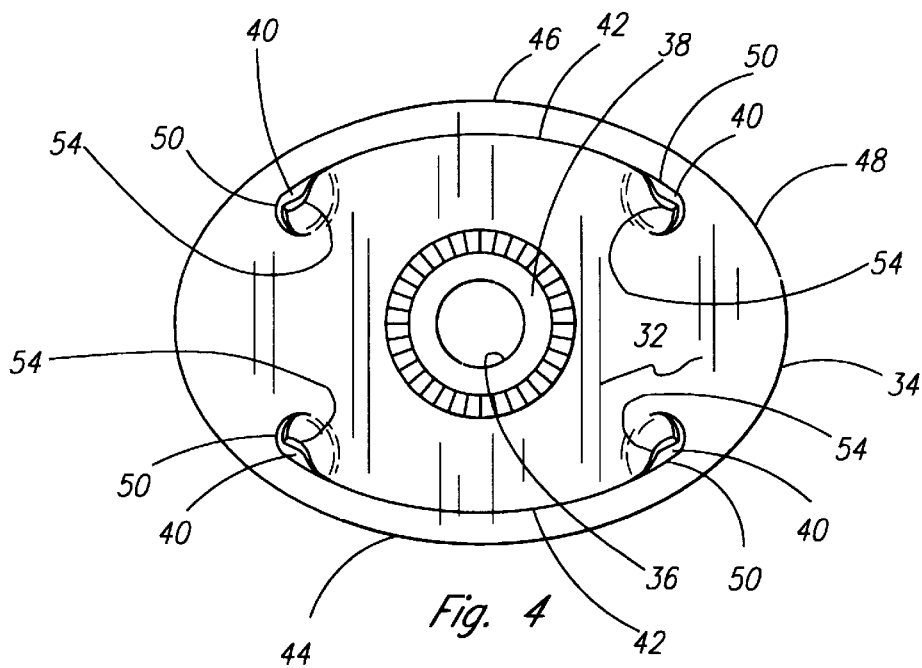
FIG. 4 is a top plan view of a mounting plate shown removed from the invention.
Figure 5:
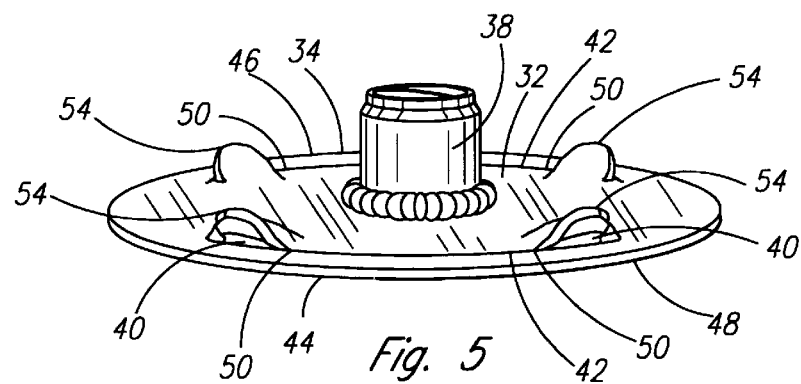
FIG. 5 is a perspective view of the mounting plate of FIG. 4.
Figure 6:
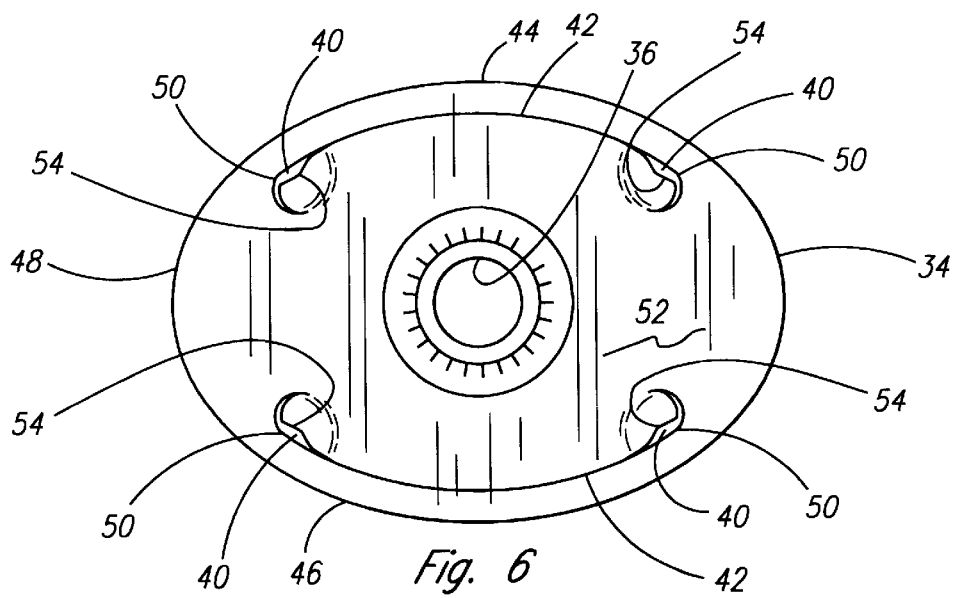
FIG. 6 is a bottom plan view of the mounting plate of FIG. 4.

Referring now also to FIGS. 4, 5 and 6, the mounting plate 34 is provided with a central opening 36 extending through it. A flange nut 38 is riveted to the central opening 36 so that the flange nut 36 surrounds the central opening 36 and extends outward from the top 32 of the mounting plate 34.

The mounting plate 34 is also provided with a plurality of gouged openings 40. The invention preferably employs four gouged openings 40, but more or less numbers of gouged openings 40 are contemplated by the invention. The gouged openings 40 are preferably formed by making two slits 42 in the mounting plate 34. One slit 42 is cut on each side 44 and 46 of the mounting plate 34 so that each slit 42 is approximately equal distance from a perimeter edge 48 of the mounting plate 34 along the entire length of the slit 42. Once the slits 42 have been made in the mounting plate 34, a punching device (not illustrated) is employed to punch or gouge the openings 40 into the mounting plate 34 at each end 50 of the slits 42. In order to gouge the openings 40 into the mounting plate 34, the punching device (not illustrated) is placed on a bottom 52 of the mounting plate 34. This allows the ears 54 that are formed as the punching device gouges the openings 40 into the mounting plate 34 to extend upward on the top 32 of the mounting plate 34. Two of the gouged openings 40 are located on one side 44 of the mounting plate 34 and the other two gouged openings 40 are located on the other side 46 of the mounting plate 34. As previously described, each of the gouged openings 40 is provided with an ear 54 that was gouged out of the mounting plate 34 as the gouged openings 40 were formed. Each ear 54 extends upward on the top 32 of the mounting plate 34. The ears 54 are located on the mounting plate 34 so that all the ears 54 enter into the oval end 22 of the tube 18 when the top 32 of the mounting plate 34 is placed against the oval end 22 of the tube 18. The mounting plate 34 is then secured to the oval end 22 of the tube 18 by spot welding through the gouged openings 40 of the mounting plate 34. In this way, the ears 54 of the mounting plate 34 are welded to an inside wall 56 of the tube 18 so that the welds 58 are not visible on the outside of the mount 10.

A bolt 60 is employed to secure the mount 10 to the top portion 12 of the sidewall 14. A hole 62 is first drilled through the top portion 12 of the sidewall 14 so that the hole 62 is large enough to admit the bolt 60. One end 64 of the bolt 60 is placed through the central opening 36 of the mounting plate 34 and threaded into the flange nut 38. The opposite end 66 of the bolt 60 is first placed through a center opening 68 provided in a wear plate 70, then through the hole 62 that was previously drilled through the top portion 12 of the side wall 14, next through a washer 72, and finally secured in place by a nut 74 that threads onto the opposite end 66 of the bolt 60. The washer 72 and nut 74 are located behind a downwardly extending sidewall lip 76 provided on the sidewall 14, as illustrated in FIG. 1, and therefore, are not visible.

The wear plate 70 is oval with an upwardly extending perimeter lip 78. The wear plate 70 is slightly larger that the mounting plate 34 so that when the mount 10 is secured to the top portion 12 of the sidewall 14, the perimeter lip 78 of the wear plate 70 completely covers and conceals the mounting plate 34. In addition to providing a means for concealing the mounting plate 34, the wear plate 70 serves as a protective cushion between the mount 10 and the top portion 12 of the side wall 14 in order to prevent the mount 10 from scratching or otherwise damaging paint on the top portion 12 of the side wall 14. The wear plate 70 is preferably constructed of plastic or other similar material.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A bed rail mount with concealed attachment for securing a cylindrical bed rail to a vehicle comprising a curved hollow tube, a female end provided on the tube for receiving an end of a cylindrical bed rail, an opposite end of the tube secured to a top side of a mounting plate via welds on the inside wall of the tube, a flange nut secured around a central opening provided in said mounting plate so said flange nut extends outward from a top side of said mounting plate, and bolt means engaging said flange nut in order to secure said mounting plate to a vehicle.

2. A bed rail mount according to claim 1 further comprising a wear plate provided between said mounting plate and said vehicle to prevent the mounting plate from damaging paint on the vehicle, and an upwardly extending perimeter lip provided on said wear plate so that said perimeter lip conceals said mounting plate.

3. A bed rail mount according to claim 1 wherein said mounting plate further comprises a plurality of ears provided in said mounting plate, said ears extending upward from said top of said mounting plate, and said mounting plate provided with an opening associated with each said ear.

* * * * *